United States Patent

Kishi et al.

[11] Patent Number: 5,933,566
[45] Date of Patent: *Aug. 3, 1999

[54] FILM ANALYZER

[75] Inventors: Takuji Kishi; Junji Yamada, both of Wakayama, Japan

[73] Assignee: Noritsu Koki Co., Ltd., Wakayama-Ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/577,744

[22] Filed: Dec. 22, 1995

[30] Foreign Application Priority Data

Dec. 28, 1994 [JP] Japan .................................. 6-327475
Jan. 5, 1995 [JP] Japan .................................. 7-000150

[51] Int. Cl.⁶ .................................................. G11B 27/00
[52] U.S. Cl. ............................... 386/52; 386/128; 348/96
[58] Field of Search ........................... 358/78, 344, 345, 358/332, 909.1, 906; 348/96, 97, 722; 360/3; 386/48, 42, 52, 43, 127, 128, 129, 130

[56] References Cited

U.S. PATENT DOCUMENTS

| | | | |
|---|---|---|---|
| 4,782,390 | 11/1988 | Hayashi et al. | 358/76 |
| 4,797,712 | 1/1989 | Hayashi et al. | 355/38 |
| 4,935,809 | 6/1990 | Hayashi et al. | 358/76 |
| 5,157,511 | 10/1992 | Kawai et al. | 358/335 |
| 5,237,648 | 8/1993 | Mills et al. | 395/133 |
| 5,258,859 | 11/1993 | Wada et al. | 358/487 |
| 5,359,712 | 10/1994 | Cohen et al. | 395/161 |
| 5,375,199 | 12/1994 | Harrow et al. | 395/159 |
| 5,497,248 | 3/1996 | Kirk et al. | 358/454 |
| 5,623,303 | 4/1997 | Inoue et al. | 348/96 |
| 5,633,733 | 5/1997 | Miyazawa | 348/96 |

FOREIGN PATENT DOCUMENTS 474234  3/1992  European Pat. Off. .

*Primary Examiner*—Thai Tran
*Assistant Examiner*—Aung S. Moe
*Attorney, Agent, or Firm*—Fulbright & Jaworski, LLP.

[57] ABSTRACT

A film analyzer for displaying print images simulated from picture frames of a photographic film on a video display. The analyzer includes a film reader for picking up image data of the picture frames, a first memory for storing the picked-up image data, an exposure condition calculating unit for calculating an exposure condition for each of the picture frames based on the image data, a simulating unit for simulating the image data read from the first memory means into a print image which is expected to be obtained as a print by exposing each picture frame under the exposure condition, a second memory for storing the simulated print image and a display control unit for causing the print image stored at the second memory to be displayed on the video display. The display control unit selectively provides a stationary display mode for displaying at least a portion of the print images of the plurality of picture frames in a stationary manner on the video display and a scroll display mode for displaying the print images of the plural picture frames in a continuously flowing manner on the video display.

10 Claims, 3 Drawing Sheets

FILM ANALYZER

BACKGROUND OF THE INVENTION

1. Field of the Invention

The present invention relates to a film analyzer for displaying print images simulated from picture frames of a photographic film on a video display. More particularly, this film analyzer includes: an image pick-up means for picking up image data of the picture frames; a first memory for storing the picked-up image data; an exposure condition calculating unit for calculating an exposure condition for each of the picture frames based on the image data; a simulating means for simulating the image data read from the first memory means into a print image which is expected to be obtained as a print by exposing each picture frame under the exposure condition; a second memory for storing the simulated print image; and a display control means for causing the print image stored at the second memory to be displayed on the video display.

2. Description of the Related Art

The film analyzer described above is used for determining an exposure condition to be used in printing an image of a photographic film on to a photosensitive material Based on the image data picked up from each picture frame of the film, the analyzer simulates its print image which is expected to be obtained if the image data are printed on the photosensitive material The analyzer displays a plurality of these simulated images in a row on a single video display monitor screen. This display operation of the plural of simulated images is effected in a stationary manner. After completion of checking of all the displayed images with a key operation, the contents of the video display can be rewritten, to display new simulated images. This type of film analyzer is known from e.g. the U.S. Pat. No. 4,935,809.

According to the above art, however, the simulated images displayed on the display screen are displayed in a row in a stationary manner. Hence, after checking all the displayed images, an image checking attendant always needs to shift the displayed contents by a key operation in order to check a next image. This is unsatisfactory in terms of checking operation efficiency for a skilled attendant. Further, although the conventional apparatus is capable of simultaneously displaying the simulation images of two film roll spliced with each other by means of a splicing tape with the image of the spliced section being interposed between the trailing and leading images of the two films on the display, this apparatus is incapable of simultaneously displaying simulation images of two independent or un-spliced films in order to improve the checking operation efficiency.

SUMMARY OF THE INVENTION

A primary object of the present invention is to provide a film analyzer which may improve the efficiency of checking operation of exposure conditions of a film or films.

For accomplishing the above-noted object, in a film analyzer according to the present invention, the display control means for causing simulated print images of a film to be displayed on a video display selectively provides a stationary display mode for displaying at least a portion of print images of a plurality of picture frames in a stationary manner on the video display and a scroll display mode for displaying the print images of the plural picture frames in a continuously flowing manner on the video display. The availability of this selection between the scroll display mode and the stationary display mode contributes to improvement of the checking operation efficiency.

A further film analyzer according to the present invention comprises a plurality of image pick-up means for picking up image data of picture images of a plurality of photographic films. In this cases the display control means causes a print image corresponding to the image data picked up by each image pick-up means to be displayed in a dedicated display section allotted within the video display screen.

With the above constructions the simulated images of the image data obtained by the respective image pick-up means, i.e. the print images, may be displayed simultaneously in the respective dedicated display sections allotted within the single video display screen. Accordingly, this construction allows the attendant to check simulated print images of a plurality of separate films at one time on the single video monitor screen. Hence, this construction will prove advantageous for further improving a checking operation efficiency especially of an experienced attendant.

According to one preferred embodiment of the invention, the scroll display mode allows variation of a scroll speed. This allows selection of an optimum scroll speed, depending on the ability or condition of the attendant, whereby the operation efficiency will be further improved.

According to a further embodiment of the invention, instead of scrolling the entire video display screen, the scroll mode allows scrolling of the print images within a row-like print image display section allotted at a part of the video monitor screen. With this, the remaining display area excluding the part allotted as the print image display section may be used for displaying other data or information. For instance, one further or more additional row-like print image display sections may be provided so as to allow simultaneous display of print images of plural separate films within the respective row-like print image display sections.

For facilitating the scroll operation, the invention further provides that the video display screen includes a touch panel which provides a command or instruction relating to the scroll display to the display control means.

Further, it will be advantageous for the printing operation if one of the print images displayed on the video display can be specified by using a pointing device such as the touch panel, a mouse, a tablet or the like and the image date of this specified picture frame is correlated with certain attribute data. As such attribute data, various kinds of data are conceivable. As some typical data, the invention suggests following three kinds as preferred embodiments.

1) Correction frame specifying means can be provided for specifying one of the print images displayed on the video display as a print image corresponding to a picture frame needing an exposure condition correction. The video display displays an exposure condition correction value given to the print image specified by the correction frame specifying means and also the image data of the picture frame corresponding to this specified print image is caused to be correlated with the exposure condition correction value as the attribute data.

2) No-print specifying means is provided for specifying one of the print images displayed on the video display as a print image corresponding to a picture frame not needing its printing. To this print image specified by the no-print specifying means, a marker is provided on the video display and also the image data of the picture frame corresponding to this specified print image is caused to be correlated with no-print data as the attribute data.

3) Print number setting means is provided for specifying one of the print images displayed on the video display and setting a desired number of prints for this specified print image. To this print image specified by the print number setting means, a print number marker is provided on the video display and also the image data of the picture frame corresponding to this specified print image is caused to be correlated with print number data as the attribute data.

The utilization of such attribute data in a printing operation will contribute to further improvement of the printing operation efficiency.

Further and other objects, features and effects of the invention will become more apparent from the following more detailed description of the embodiments of the invention with reference to the accompanying drawings.

DESCRIPTION OF THE PREFERRED EMBODIMENTS

Preferred embodiments of a film analyzer relating to the present invention will now be described in details with reference to the accompanying drawings.

Figure 1:
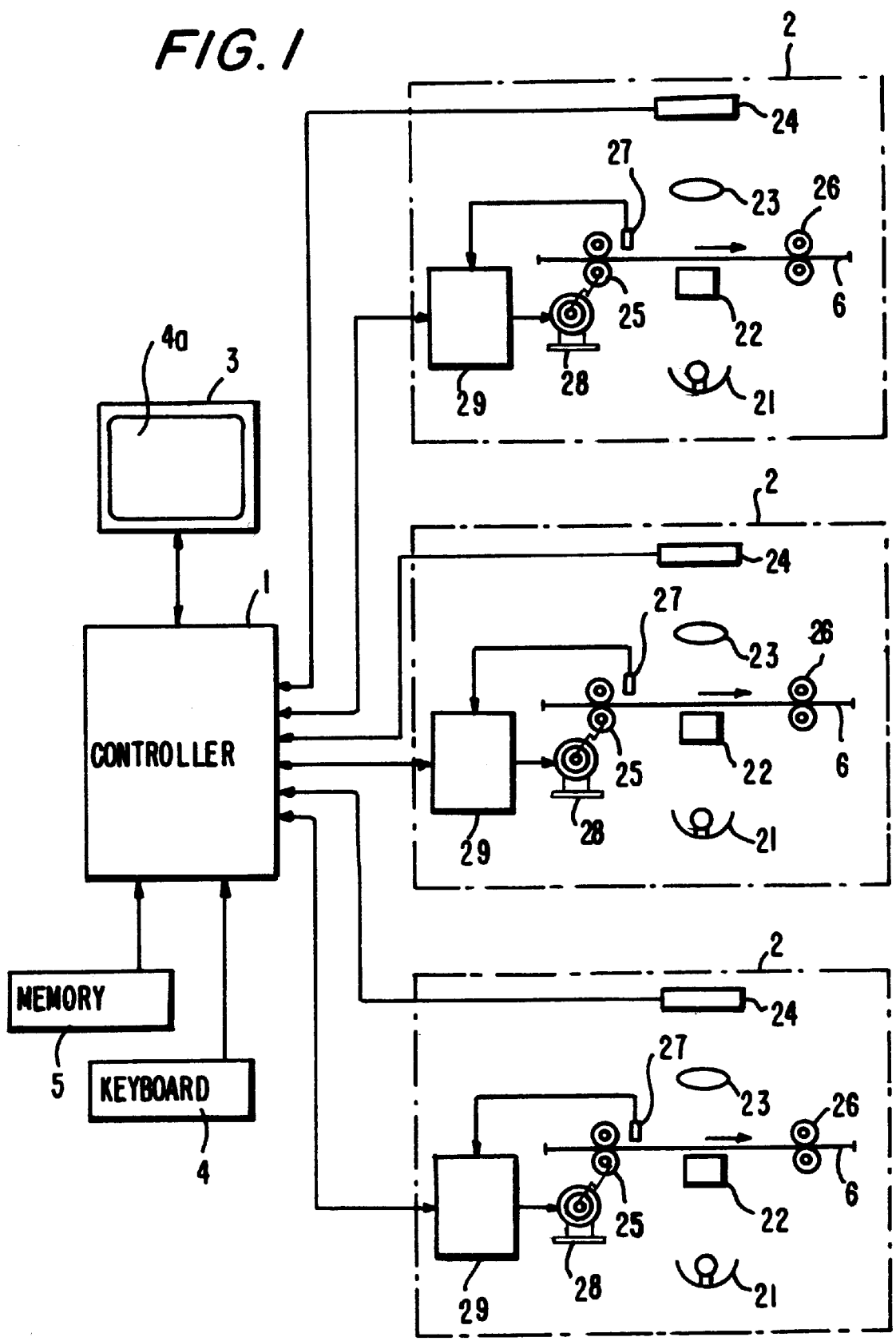
FIG. 1 is a block diagram showing a film analyzer according to one preferred embodiment of the present invention.

As shown in FIG. 1, a film analyzer according to this embodiment includes three image pick-up devices 2. In addition, the analyzer includes, as further main components thereof, a controller 1 including a microcomputer as a main component thereof for controlling an image processing operation and other operations of the entire apparatus, a color CRT monitor 3 ('monitor' hereinafter) as an embodiment of a video display for displaying print images or the like for use in a photographic printing operation, a control console 4 such as a keyboard, mouse, joggle, tablet or the like as an input device for inputting various commands to the controller 1, and an external memory 5 for storing various data.

Next, the respective components will be described.

The three image pick-up devices 2 are used for picking up image data of respective picture frames of photographic films 6 while the films 6 are being transported. As these devices are identical to each other, only one of them will be described next.

The image pick-up device 2 includes a light source 21, a mirror tunnel 22 for rendering light intensity uniform, an imaging lens 23, a CCD image pick-up device 24 employed as an example of a film reader, rollers 25, 26 for transporting the film 6 through a light metering path extending from the light source 21 to the CCD image pick-up device 24, an image detecting sensor 27 for detecting a position of a picture frame by a density difference between a transparent portion and an image bearing portion of the film 6, a motor 28 for driving the rollers 25, 26, and a drive control unit 29 for driving the motor 28 based on detection of the image detecting sensor 27. The CCD image pick-up device 24 includes three units of CCD image sensors for picking up an image of the film 6 formed on a light receiving surface with separating the image into the three primary color components of R (red), G (green) and B (blue).

The drive control unit 29 drives the motor 28 based on the detection of the position of a picture frame of the film 6 by the image detecting sensor 27 for intermittently transporting the film 6 so as to appropriately position each picture frame on the light metering path When the picture frame of the film 6 is appropriately positioned on the light metering path, the drive control unit 29 transmits a READY signal to the controller 1 Upon reception of this READY signal, the control 1 inputs image-bearing signals generated by the CCD image pick-up device 24.

Figure 2:
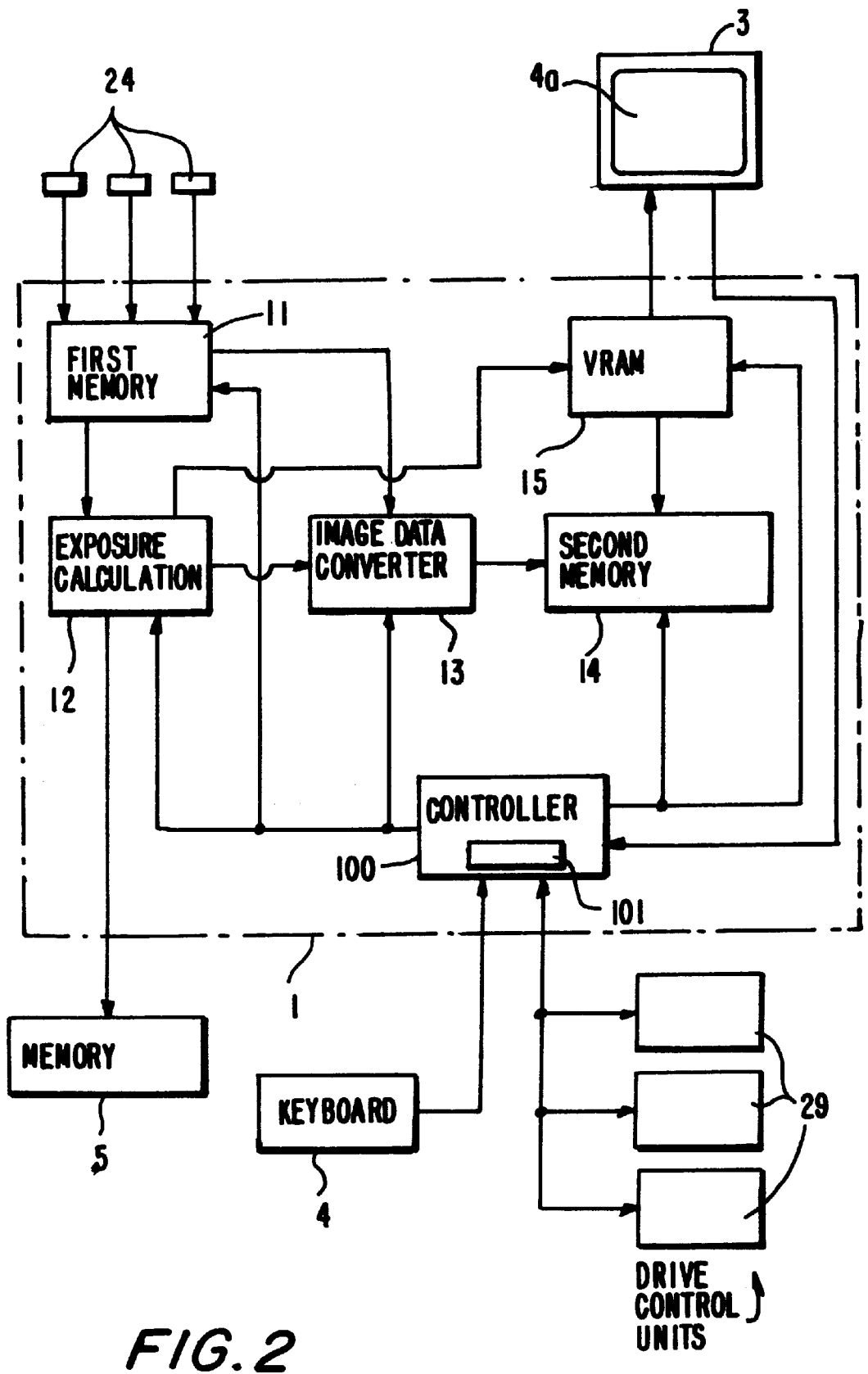
FIG. 2 is a block diagram of a control unit of the embodiment.

As shown in FIG. 2, the controller 1 includes a first memory 11 for storing the image data of respective picture frames of the film 6 picked up by the CCD image pick-up devices 24, an exposure condition calculating unit 12 for determining an exposure condition for exposing onto a print paper as a photosensitive material the image data read out from the first memory 11, an image data converter unit 13 for converting the image data read out from the first memory 11 into a print image (i.e. simulated image data) based on the exposure condition determined by the exposure condition calculating unit 12, a second memory 14 for storing the print image converted by the image data converter unit 13, a VRAM (video random access memory) 15 for storing data to be displayed on a monitor 3, and a controller 100 for controlling the operations of the above-mentioned components. Within the controller 100, there is specifically defined a display control unit for executing control operations relating to the display by the monitor 3, and this display control unit is denoted with a reference numeral 101.

The first memory 11 has such a memory capacity as to be able to store entire image data of the films 6 read respectively by the three image pick-up devices 2.

For each one of the image pick-up devices 2, the exposure condition calculating unit 12 effects following exposure condition calculations each time the unit 12 inputs image data of one film roll.

Namely, when the first memory 11 has accumulated image data of one roll of film 6, prior to determination of the exposure condition for each picture frame, each and every picture frame of the one film roll 6 is divided into a number of areas, and a statistical averaging calculation is effected on the densities of the respective R (red), G (green) and B (blue) color components of all the divided areas of the entire roll of film 6. With this calculation, there is obtained film characteristics unique to this film 6 concerning expected color development of the film 6 in accordance with the magnitude of the amounts of light received from a photographic subject(s).

For determining the exposure condition for each picture frame of the film 6, first, based on the average density of each frame, i.e. the average light amount received by this frame from the subject, light development characteristics of the picture frame are obtained in connection with 'original' film characteristics inherent with this film 6 such as the base color of the film.

The exposure condition calculating unit 12 in advance stores therein a mathematical algorithm for determining an exposure condition which allows proper color reproduction of the image data of the film 6 on a print paper by compensating for the original film color development characteristics of the film 6 including the base color of this film 6. Then, by using this algorithm, the exposure condition is determined from the color development characteristics obtained as described supra corresponding to each picture frame.

The exposure condition thus determined may be corrected by a user's operation on a density correction key provided to the control console 4 for instructing increment or decrement of the exposure amount of each of Y (yellow), M (magenta)

and C (cyan) color components or increment or decrement of the average exposure amount corresponding to the photographic density variation. Upon receipt of such correction instruction, the exposure condition calculating unit 12 corrects the exposure condition.

The image data converter unit 13 stores in advance therein a mathematical algorithm for executing a data conversion operation such as a negative-to-positive conversion on the image data read out from the first memory 11. And, various parameters constituting this algorithm may be varied based on the exposure condition determined by the exposure condition calculating unit 12.

Then, the image data converter unit 12 simulates the image data inputted thereto into a print image which is expected to be obtained on the print paper when the image data of the film 6 is exposed on the print paper.

In the second memory 14, the respective print images, i.e. the simulated image data are stored with maintaining information concerning the order of the respective films as well as the serial order of the picture frames within each film so as to correlate these simulated image data with names of the films and the serial frame numbers of the picture frames thereof.

The VRAM 15 stores one screen amount of data to be displayed on the monitor 3. And, respective memory areas of the VRAM 15 are adapted to correspond in a one-to-one relationship with respective display areas on the monitor 3. Accordingly, the data written into this VRAM 15 may be displayed as they are on the monitor 3.

Figure 3:
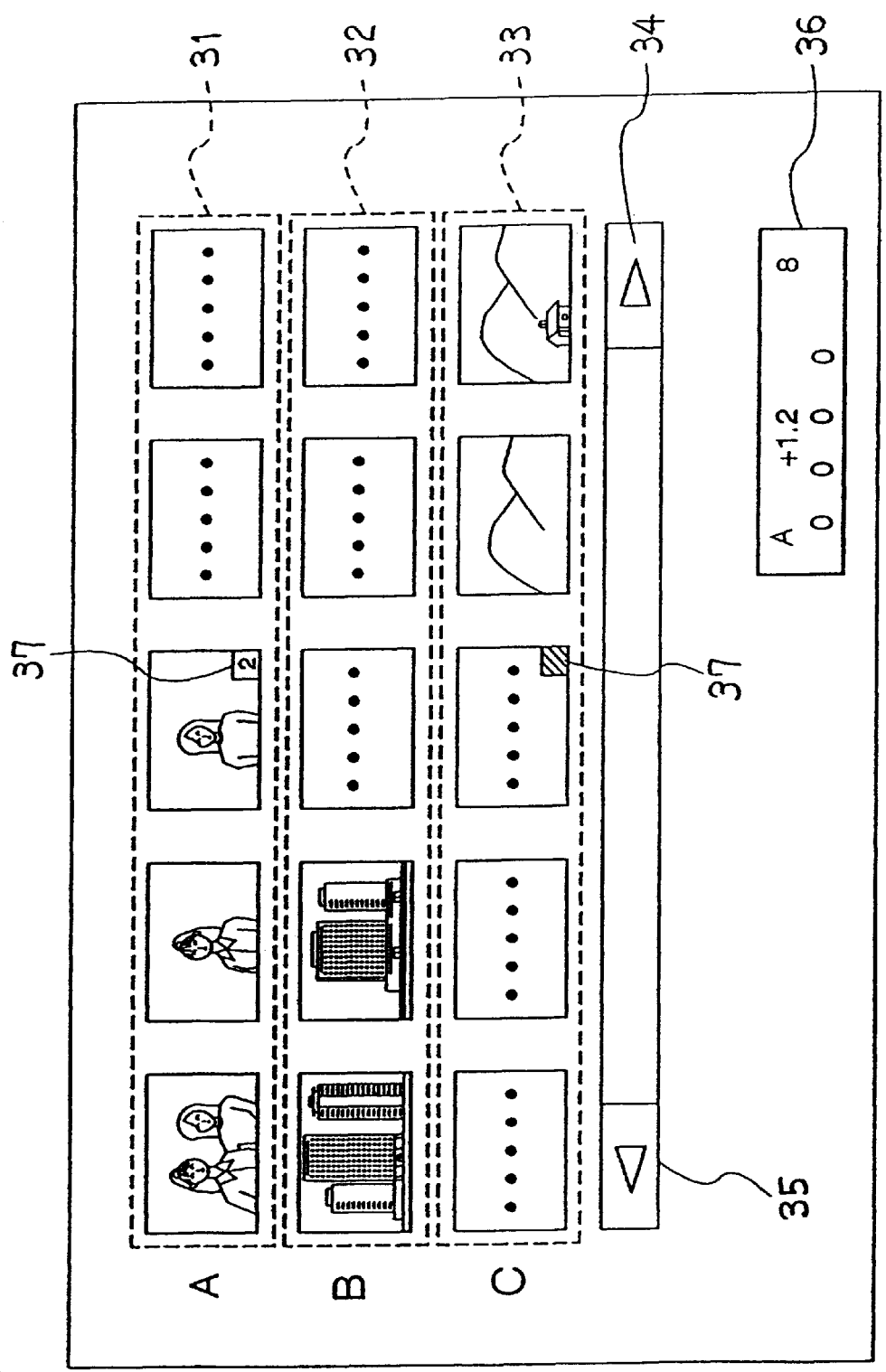
FIG. 3 is a view showing a sample of monitor display in the embodiment.

For instance, as may be seen in a sample display shown in FIG. 3, the VRAM 15 of this embodiment stores image data of total 15 (fifteen) picture frames, five picture frames from each one of the three films processed by the respective image pick-up devices 2. Further, as may also be seen in the sample display of FIG. 3, on the monitor screen, there are three print image display areas 31, 32, 33 for each displaying five picture frames of a film. Hence, the VRAM 15 too includes image memory areas corresponding thereto. Then, of the simulated image data as the print images stored in the second memory 14, simulated image data selected therefrom by the display control unit 101 are serially written into the print image display areas of the VRAM 15, so that desired images are displayed on the monitor 3.

Further, the print images may be shifted on the monitor screen in the direction of the juxtaposition of the picture frames of the film 6, i.e. to the right or left on the screen by means of a data operation at the VRAM 15 comprised of combination of a data shift operation by the display control unit 101 on the image data at the print image memory areas of the VRAM 15 and a data transfer operation for transferring data from the second memory 14 to the print image memory areas of the VRAM 15.

Accordingly, when the above-described data operation at the VRAM 15 is effected in a continuous manner in the incrementing order of the serial picture frame numbers of the film, the print images corresponding to the respective picture frames are scrolled to the right side in the print image display area on the monitor 3. Conversely, when the data operation is effected in the continuous manner in the decremental order of the serial picture frame numbers, the print images are scrolled to the left side in the print image display area on the monitor. This scroll display mode becomes possible by commanding a "scroll display mode" to the display control unit 101 from the control console 4 or a pointing device to be described later.

Also possible is the conventionally practiced stationary print image display mode in which the print images of the five picture frames are displayed intermittently frame by frame in the incrementing or decrementing direction. Such intermittent display mode is realized by commanding a "stationary display mode" to the display control unit 101.

Further, by varying the interval of the afore-described data operation at the VRAM 15 comprised of the combination of the data shifting operation of the image data at the print image area of the VRAM 15 by the display control unit 101 and the data transfer operation from the second memory 14 to the print image memory area of the VRAM 15, it is possible to vary the speed of scroll. And, this variation of the scroll speed too may be commanded, when desired, from the control console 4 to the display control unit 101.

Moreover, as will be described later, other data such as the exposure condition determined by the exposure condition calculating unit 12 are written also into the VRAM 15 by the display control unit 101 to be displayed subsequently on the monitor 3.

In this, by using the pointing device acting as a correction frame specifying means for specifying one of the print images being displayed on the monitor 3, it is possible to correct the exposure condition for a specific print image. Then, this correction value is displayed on the monitor 3 and also the image data converter unit 13 generates new simulated image data based on this correction instruction, so that the monitor 3 displays a revised print image based on the new exposure condition based on the correction instruction. At the same time, as attribute data, the corrected exposure condition is caused to be correlated with the image data of the particular picture frame of the film 2 for use in a subsequent process, such as a photographic printing process.

In this embodiment, for one of the print images specified by the pointing device, a no-print instruction and/or a print number instruction may be provided and displayed on the monitor 3. Needless to say, such further data too may be caused to be correlated as further attribute data with the image data of the corresponding picture frame. For these data correlations, a data management method which per se is well-known may be employed.

On the display screen of the monitor 3, there is provided a touch panel 4a as an example of the pointing device described supra, so that an instruction from this touch panel 4a is inputted to the display control unit 101 of the controller 1.

When the touch panel 4a is operated, i.e. touched at a position of a right-hand scroll indicator mark 34 shown in FIG. 3, the display control unit 101 effects a forward scrolling operation for scrolling, within the three stages of print image display areas 31, 32, 33, the image data of the picture frames of the films 6 to the right side. Conversely, when the touch panel 4a is operated at a further position of a left-hand scroll indicator mark 35, the display control unit 101 effects a reverse scrolling operation by scrolling the image information of the films 6 to the left side in FIG. 3.

In the course of this scrolling to the right or left side, if the touch panel 4a is operated at a position within one of the three stages of the print image display areas 31, 32, 33, the display control unit 101 suspends the scrolling operation, and the corresponding picture frame being displayed at this particular position where the touch panel 4a has been operated is specified based on the operated position of the touch panel 4a and on the address or order data stored at the VRAM 15.

Next, the overall operation of the film analyzer having the above-described construction will be briefly described.

First, when films 6 to be analyzed are loaded to the respective three image pick-up devices 2, upon input of a scanning start command from the control console 4, the respective drive control units 29 of the image pick-up devices 2 start transporting the films 6, so that image data scanned by the respective CCD image pick-up devices 24 which are operated in synchronism with the transportation of the films 6 are written into the first memory 11 of the controller 1.

After the three image pick-up devices each have completed the scanning operation of the image information of one entire film roll 6, exposure conditions for the respective picture frames of the films 6 are determined, and then the simulated print images thereof are produced and written into the second memory 14.

Under the above condition, when the touch panel 4a is operated at the position of the right scroll indicator mark 34, the image data of the respective picture frames are scrolled to the right side in the print image display areas 31, 32, 33 on the monitor 3.

When the system attendant finds, in the print images being scrolled one after another, a certain picture frame on which he/she desires to effect an exposure condition correction or to specify as a picture frame needing no print, he/she operates the touch panel 4a at the position thereof displaying the print image of this picture frame.

With the above touch panel operation, the scrolling operation of the print images is suspended and also the picture frame designated from the touch panel 4a is specified.

After the suspension of the scrolling operation, the attendant may input via the control console 4 a correction amount of the exposure condition, an instruction for non-print or on the number of prints to be produced from the specified image data.

With the input of the correction amount of the exposure condition, as shown in FIG. 3, the exposure condition of the specified picture frame in the form of a numeric value according to an amount of operation on a correction input key provided on the control console 4 is displayed on an exposure data display area 36 on the display screen of the monitor 3.

As also shown in FIG. 3, the displayable contents of the exposure data display area 36 specifically include, from the upper left side in the figure, a letter 'A', 'B' or 'C' denoting which of the three film readers 3 the specific picture frame relates to, an average density value of the picture frame, and the serial frame number of the picture frame and the contents further include, from the lower left side in the same figure, a correction value for the Y (yellow) correction key, a correction value for the M (magenta) correction key, a correction value for the C (cyan) correction key, and a correction value for the density correction key. Incidentally, upon completion of input(s) of a correction instruction(s), these display contents of the exposure data display area 36 are erased entirely.

When an instruction for no-print is inputted, as shown in FIG. 3, a no-print mark (in this case, a shading) is displayed at a small box area 37 within the area of the specified print image. Alternatively, when a print number is inputted, as shown in FIG. 3, this print number is displayed at the small box area 37. Incidentally, the print number is initially set to '1' with absence of input of a print number. When the attendant completes the input operation from the control console 4 and then operates the touch panel 4a again at the position of the right scroll indicator mark 34, the scroll display mode is resumed to restart the continuous scrolling operation to the right side. Conversely, when the touch panel 4a is operated at the display position of the left scroll indicator mark 35, a left scrolling operation is started. The above-described suspension and resumption of the scroll operation and various input operations are possible regardless of the direction of the scrolling.

When the entire film analysis operation has been completed on the three films 6 scanned by the three image pick-up devices 2, with an instruction from the controller 100, the data concerning the corrected exposure condition as needed and/or indicating the print number or no-print are written into the external memory 5 in correlation with the respective specified picture frames.

The memory medium of this external memory 5 is detachable from the memory proper, so that the detached memory medium storing the above data may be used for inputting these data such as the exposure condition data to the photographic printer apparatus.

Other Embodiments

Next, other embodiments of the invention will be specifically described.

(1) In the foregoing embodiment, the film analyzer is used independently. Instead, this analyzer may be integrated into the photographic printer apparatus.

(2) In the foregoing embodiment, the monitor 3 displays image data of five picture frames with respect to one image pick-up device 2. The number of picture frames to be displayed may vary depending on the size or the aspect ratio of the monitor 3. For instance, if a laterally elongated monitor 3 having a Brown tube adapted for the Hivision broadcasting system is employed, the number of displayed picture frames may be increased for further convenience.

(3) In the foregoing embodiment, the switchover between the scroll display mode and the stationary display mode is effected by means of an input from the touch panel 4a. Instead, this input may be effected from the control console 4 or by specifying a location on the monitor 3 using a light pen.

(4) In the foregoing embodiment, the switchover between the scroll display mode and the stationary display mode is effected by operating the touch panel 4a at the print image display areas 31, 32, 33. Instead, this switchover may be effected by operating the touch panel 4a at a position in the periphery of the print image display areas 31, 32, 33.

(5) In the foregoing embodiment, the correction instruction of the exposure condition and the instruction of no-print or a print number are inputted from the control console 4. Instead, these too may be inputted from the touch panel 4a.

(6) In the foregoing embodiment, the CCD image pick-up device 24 is employed as the film reader. Instead, a CCD line sensor, MOS image sensor, a video camera or the like may be employed.

Further, for scanning the image data with the data separated in the R, G and B components, a rotary color filter and a single image sensor may be employed in combination.

(7) In the foregoing embodiment, the exposure condition calculating unit 12 determines the exposure condition based on the image information of picture frames of one roll of film 6. Instead, this unit 12 may determine an exposure condition of one picture frame alone based on the image information of this frame, with using e.g. the DX code recorded on the film 6.

(8) In the foregoing embodiment, the print number or the no-print mark is displayed at the small area 37 overlapped with the display area of the print image of the specified picture frame. Alternatively, this area 37 may be disposed outside the display area of the specified frame, as long as such different positioning of the area still allows unambiguous correspondence between the displayed mark or number and the specified frame.

(9) In the foregoing embodiment, after the display mode is switched over from the stationary display mode to the scroll display mode by an operation of the touch panel 4a at the display position of the right scroll indicator mark 34 or the left scroll indicator mark 35, this scroll display mode is continued until the touch panel 4a is operated at a position in the print image display areas 31, 32, 33. Alternatively, it is also possible for this scroll display mode to be maintained only while the touch panel 4a is being operated at the display position of the right scroll indicator mark 34 or the left scroll indicator mark 35.

(10) Further, the system may be modified such that the print image display areas 31, 32, 33 may be under the scroll display mode or stationary display mode independently of each other.

(11) In the scroll display mode, as the monitor display contents are shifted or moved by the unit of the minimum display bit, i.e. one bit unit, the contents may be scrolled in a smooth flowing manner. In this respect, the invention further includes within its scope a different scroll display mode in which the contents are shifted by a plurality of bits when needed or appropriate.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A film analyzer for displaying print images simulated from a plurality of picture frames of photographic films on a video display, which comprises:
    image pick-up means for picking up image data of the picture frames from at least a first roll of film and a second roll of film;
    a first memory for storing the picked-up image data;
    an exposure condition calculating unit for calculating an exposure condition for each of the picture frames based on the image data;
    simulating means for simulating the image data read from the first memory into a print image which is expected to be obtained as a print by exposing each picture frame under the calculated exposure condition;
    a second memory for storing the simulated print image;
    display control means for causing all of the print images stored in the second memory to be displayed on the video display, said display control means displaying:
    a plurality of the print images of the plurality of picture frames obtained from said first roll of film within a row-like print image display section allotted to a part of the video display and
    a plurality of the print images of the plurality of picture frames obtained from said second roll of film within another row-like print image display section allotted to another part of the video display;
    said display control means selectively providing a stationary display mode and a scroll display mode;
    wherein the stationary display mode displays the print images from said first and second rolls of films in a stationary manner in the respective row-like print image display section, and wherein the scroll display mode allows continuously scrolling and constantly displaying the plurality of the print images from said first and second rolls of film in a sequence corresponding to the sequence of picture frames in the respective roll of film in the respective row-like print image display section, and
    correction frame specifying means for specifying one of the print images displayed on the video display as a print image corresponding to a picture frame needing an exposure condition correction, wherein said video display displays an exposure condition correction value given to the print image specified by said correction frame specifying means, and the image data of the picture frame corresponding to this specified print image is caused to be correlated with the exposure condition correction value as attribute data.

2. A film analyzer according to claim 1, wherein said scroll display mode allows variation of a scroll speed.

3. A film analyzer according to claim 1, wherein a plurality of said row-like print image display sections are provided.

4. A film analyzer according to claim 3, wherein said row-like print image display sections respectively display the print images of different photographic films.

5. A film analyzer according to claim 1, wherein said video display screen includes a touch panel for providing said display control means with commands relating to the scroll display.

6. A film analyzer according to claim 1, further comprising no-print specifying means for specifying one of the print images displayed on the video display as a print image corresponding to a picture frame not needing its printing;
    wherein to the print image specified by said no-print specifying means, a marker is provided on the video display and the image data of the picture frame corresponding to this specified print image is caused to be correlated with no-print data as attribute data.

7. A film analyzer according to claim 1, further comprising print number setting means for specifying one of the print images displayed on the video display and setting a desired number of prints for this specified print image;
    wherein, to the print image specified by said print number setting means, a print number marker is provided on the video display and the image data of the picture frame corresponding to this specified print image is caused to be correlated with print number data as attribute data.

8. A film analyzer according to claim 1, wherein said image pick-up means comprises a first image pick-up device for picking up image data from said first roll of film and a second image pick-up device for picking up image data from said second roll of film.

9. A film analyzer for displaying print images simulated from a plurality of picture frames of a photographic film on a video display, which comprises:
    image pick-up means for picking up image data of the picture frames from at least a first roll of film and a second roll of film;
    a first memory for storing the picked-up image data;
    exposure condition calculating unit for calculating an exposure condition for each of the picture frames based on the image data;
    simulating means for simulating image data read from the first memory into a print image which is expected to be obtained as a print by exposing each picture frame under the calculated exposure condition;

a second memory for storing the simulated print image;

display control means for causing all of the print images stored in the second memory to be displayed on the video display, said display control means displaying a plurality of the print images of the plurality of picture frames obtained from said first roll of film within a row-like print image display section allotted to part of the video display, and a plurality of the print images of the plurality of picture frames obtained from said second roll of film within another row-like print image display section allotted to part of the video display, said display control means selectively providing a stationary display mode and a scroll display mode, wherein the stationary display mode displays the print images from said first and second rolls of films in a stationary manner in the respective row-like print image display section, and wherein the scroll display mode allows continuously scrolling and constantly displaying the plurality of the print images from said first and second rolls of films in a sequence corresponding to the sequence of picture frames in respective roll of film in the respective row-like print image display section.

10. A film analyzer according to claim 9, wherein said image pick-up means comprises a first image pick-up device for picking up image data from said first roll of film and a second image pick-up device for picking up image data from said second roll of film.

* * * * *